(12) United States Patent
Kuyama et al.

(10) Patent No.: US 6,417,589 B1
(45) Date of Patent: Jul. 9, 2002

(54) FLAT VIBRATING MOTOR AND PORTABLE DEVICE HAVING THE SAME

(75) Inventors: Koji Kuyama; Shigeru Yoshida; Kodo Fukuoka; Mikio Umehara, all of Tottori (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/523,566

(22) Filed: Mar. 10, 2000

(30) Foreign Application Priority Data

Mar. 15, 1999 (JP) ............................................. 11-068164

(51) Int. Cl.[7] ............................... H02K 7/06; H02K 1/22
(52) U.S. Cl. ........................................... 310/81; 310/80
(58) Field of Search ............................ 310/80–81, 261, 310/40 MM, 268, 156.12; 340/311.1, 407.1, 7.6; 381/192, 194, 199, 205, 188

(56) References Cited

U.S. PATENT DOCUMENTS

| | | | |
|---|---|---|---|
| 4,468,579 A | * 8/1984 | Suzuki ........................ 310/208 |
| 4,980,590 A | 12/1990 | Taniguchi et al. ............. 310/81 |
| 5,027,025 A | 6/1991 | Saneshige et al. ............. 310/81 |
| 5,471,103 A | * 11/1995 | Fujii ............................ 310/81 |
| 5,621,260 A | 4/1997 | Fukuoka et al. ............... 310/81 |
| 5,942,833 A | * 8/1999 | Yamaguchi .................. 310/268 |
| 6,011,333 A | * 1/2000 | Yamaguchi et al. ........... 310/81 |
| 6,104,114 A | * 8/2000 | Takeda et al. ................ 310/90 |
| 6,274,955 B1 | * 8/2001 | Satoh et al. ................... 310/81 |

* cited by examiner

*Primary Examiner*—Tran Nguyen
(74) *Attorney, Agent, or Firm*—Ratner & Prestia

(57) ABSTRACT

A motor includes (a) a stator having a stator core wound with a coil, (b) a rotor having a magnet facing the stator core via an annular space and a yoke disposed on an outer wall of the magnet, and (c) an unbalancing weight disposed on an outer wall of the yoke. This structure allows the motor to be small in size, light in weight, thin, flat and to function as a vibrating motor producing maximum vibration at low power consumption. The motor thus contributes to realizing a portable device with a small size, a low weight, and which is operable for many hours.

9 Claims, 13 Drawing Sheets

FLAT VIBRATING MOTOR AND PORTABLE DEVICE HAVING THE SAME

FIELD OF THE INVENTION

The present invention relates to a vibrating motor used as a vibration messaging device employed largely in portable apparatuses.

BACKGROUND OF THE INVENTION

Cellular phones, among other portable apparatus, are desired to be easy-to-carry, operable for long hours and having superior functions. Naturally, the motor to be mounted to the cellular phones is required to meet those requirements. To be more specific, the motor should be firstly of small size and lightweight, and secondly, produce the maximum vibrations at low power consumption.

A coreless motor in a cylinder having a small diameter has been used because it more or less meets those requirements. U.S. Pat. No. 5,621,260 (based on Japanese Patent Non-examined Application Publication Nos. H04-268507, H05-5561 and H05-115720) has also been obtained based on this technique.

This prior art teaches the following technique: a low-magnetic-flux-density section in a yoke through which magnetic flow travels is specified, and the thickness of the section is reduced so that the motor can maintain its performance although its outer dimensions are lessened. Such techniques have been accumulated thereby dealing with demands from the market.

Recently a number of cellular phones producing enough vibrations has increased, and when the cellular phone put on a desk produces vibrations, the phone moves on the desk due to the vibrations and falls thereoff. Since this kind of accident occur so frequently, this moving phenomenon should be avoided and yet a large vibrating message is desirably produced in addition to satisfying the requirements discussed above. This moving phenomenon is influenced by a rotary shaft of the motor because the rotary shaft is disposed parallel to the desktop surface. This parallel rotary shaft often imparts a force of moving the cellular phone parallel with the desk-top when the phone receives a force of taking off the desk-top by rotating an unbalancing weight. A countermeasure against this moving phenomenon is to dispose the rotary shaft in a manner other than parallel with the desk-top. In other words, a flat and thin motor having a rotary shaft vertical with regard to the desktop is desired.

In order to enhance the easy-to-carry characteristic of cellular phones without losing the easy-to-operate feature, a thinner body is desired from the market. The vibrating motor is thus desirably in the thinner structure. The vibrating motor desirably addresses this third issue in addition to the two issues discussed above, i.e. the first one is small size and lightweight, the second one is to produce the maximum vibrations at low power consumption.

The thin vibrating motor, desired thirdly, has been disclosed in U.S. Pat. No. 4,980,590 (based on Japanese Patent Non-examined Application Publication No. S62-246383.) This prior art teaches a flat brushless vibrating motor. This prior art employs a coreless motor having an axial air-gap type magnetic field and a rotary-back-yoke so that a compact size vibrating motor without disposing an unbalancing weight on an output shaft can be realized. The rotary-back-yoke is formed in an unbalanced shape thereby building a vibration-producing-function in the motor.

U.S. Pat. No. 5,027,025 has been obtained based on Japanese Patent Non-examined Application Publication No. H01-29114. This prior art further develops its technique discussed above and discloses that an unbalance-producing-function is provided to a rotating magnet of the coreless motor having the axial air-gap type magnetic field. As a result, the greater vibration is producible.

SUMMARY OF THE INVENTION

The present invention provides a vibrating motor that is small, lightweight, and provides maximum vibrations at low power consumption, and has a thin and flat structure. The motor has yet a high reliability. A motor of the present invention comprises the following elements:

(a) a stator having a stator core on which coils are wound;
(b) a rotor having a magnet facing the stator core via an annular space, and having a yoke disposed on an outer wall of the magnet; and
(c) an unbalancing weight disposed on an outer wall of the yoke.

This structure allows the motor to satisfy all the requirements, i.e. the small size, light weight, the maximum vibrations at low power consumption, and a thin and flat construction, and yet this structure ensures high reliability. As a result, a thin and flat portable device operable for long hours is achievable.

DETAILED DESCRIPTION OF EXEMPLARY EMBODIMENTS

Figure 1:
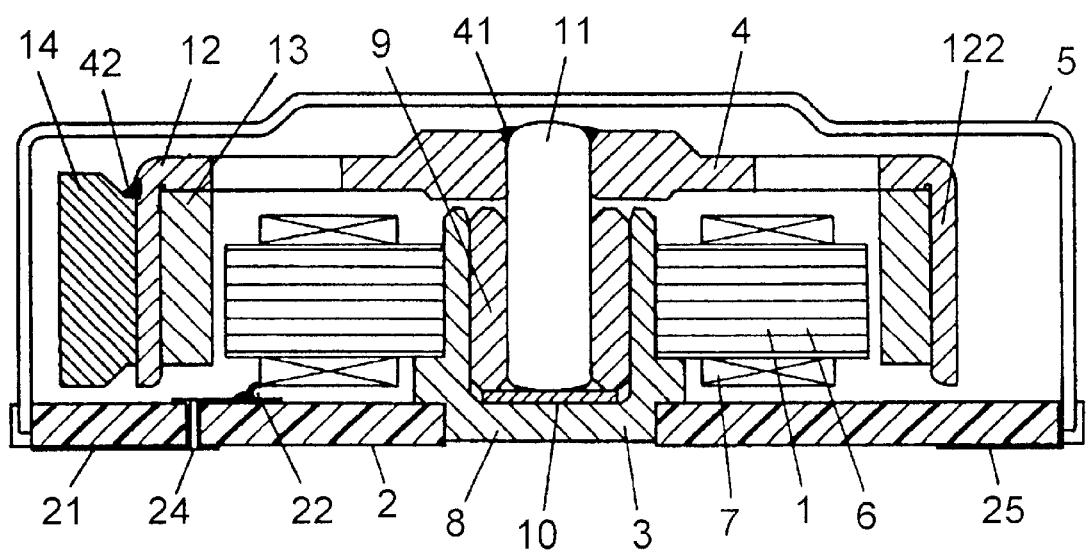
FIG. 1 is a cross sectional view illustrating a construction of a motor in accordance with a first exemplary embodiment of the present invention.

Although the conventional thin and flat vibrating motor has undergone such development history as discussed previously, this motor cannot be a main stream in the cellular phone application. The reason is that this motor is inferior to a coreless motor within a cylinder having a small diameter in two points: 1. small size and lightweight, 2. low power consumption. The inventors of the present invention thus have started developing a motor having a flat and thin structure. Yet, the inventors have tried to satisfy the desire for small size, light-weight and low power consumption, with this new motor.

A small size and lightweight are desirable conditions for the motor used in the cellular phones. If this motor gains weight, it directly lowers reliability of the motor because this motor is required to withstand drop and impact up to between 10,000 G and 20,000 G. Regarding the power consumption, it directly influences the battery weight of the phone. The motor thus should be designed to be efficient as much as possible.

Considering these conditions, the inventors have tried to find an optimum structure of the thin vibrating motor. There are several selection steps before determining the optimum structure: 1. Which is better, coreless or with core? 2. Which is a better magnetic circuit, an axial air-gap type magnetic field or a radial air-gap type magnetic field? 3. Which is better, rotating core with a brush or rotating magnet without brush (brushless)?

1. Coreless or with core?

A structure coming with a core produces a higher permeance of a magnetic circuit, thereby reducing substantially the magnet quantity. The inventors have thus selected the structure coming with a core. According to the data of a trial production of this motor, the ratio of the magnet volume used in the coreless structure vs. the structure with the core is ca. 3:1. This ratio is not affected by selecting the rotating coil or rotating magnet. Selecting the structure with the core thus greatly influences the motor weight.

2. An axial air-gap type magnetic field or a radial air-gap type magnetic field?

When the structure coming with the core is selected, the radial air-gap type magnetic field is naturally selected.

3. Rotating core with a brush or rotating magnet without brush (brushless)?

The structure of employing the rotating core with the brush consumes less power than the other one; however, the brush contributes to enlarging the dimensions. The structure of employing the rotating magnet without a brush (brushless) has an advantage in reducing the thickness over the other type, and also has an advantage in producing large vibrations over the other type because the brushless type can employ an outer-rotor structure. Therefore, the inventors have selected the structure employing the rotating magnet without the brush (brushless).

In conclusion, the optimum structure determined based on the three conditions discussed above is a flat-brushless motor with the core having the radial air-gap type magnetic field.

Next, the inventors have studied how to exert this motor's maximum capability within a limited space where an unbalancing weight is incorporated.

Various methods have been proposed to realize an unbalancing function in motors not only for cylindrical motors, flat motors but also other types of motors. For instance, parts of a rotating coil should be omitted, a rotating core should be abnormally shaped, parts of a rotating yoke should be cut away and the like. However, these methods are not the products by exhaustively investigating the small size, light weight, and greater vibrations, because the specific gravity of these elements are no more than 5–8. These methods are thus not the way to pursue an ultimate optimum motor for the cellular phone application. In other words, when a motor of small size and light weight is pursued, an unbalancing weight being commercially available and having the highest possible specific gravity is desirably used.

Methods of trading off the motor performance with the unbalancing function have also been proposed. Some of the methods discussed above fall into this group. Those methods are also not the products of investigating exhaustively the small size, light weight and the low power consumption. When a motor satisfying the small size, light weight and yet the low power consumption is pursued, a completed motor exerting its maximum capability is desirably used, and an unbalancing weight made of a material having a high specific gravity is desirably incorporated with this motor in an optimum condition. This is a subject of the present invention.

Exemplary embodiments of the present invention are demonstrated hereinafter with reference to the accompanying drawings.

(Exemplary Embodiment 1)

Figure 2A:
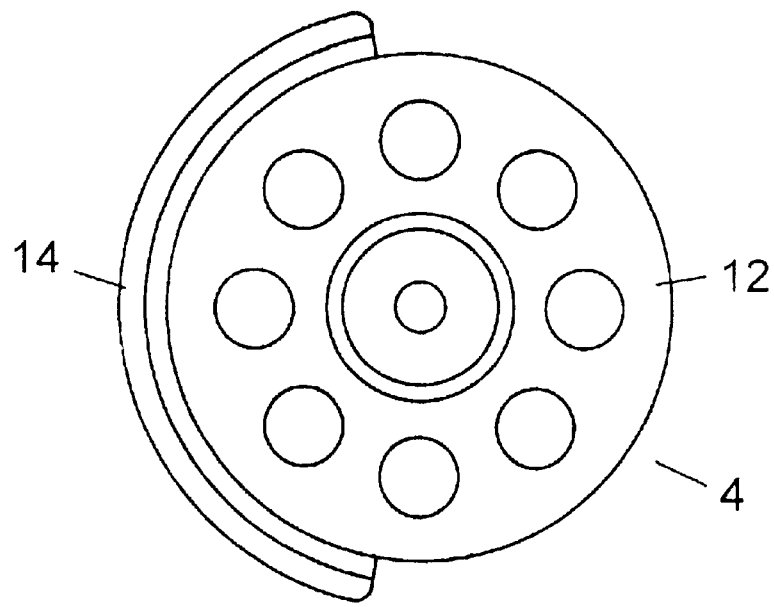
FIG. 2A is a plan view of a rotor and an unbalancing weight in accordance with the first exemplary embodiment of the present invention.
Figure 2B:
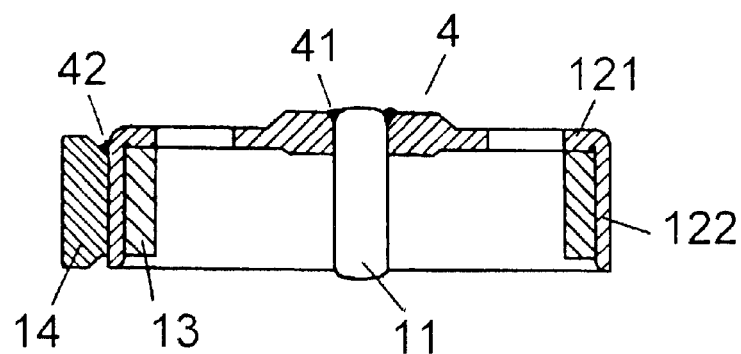
FIG. 2B is a side cross sectional view of the rotor and the unbalancing weight.
Figure 2C:
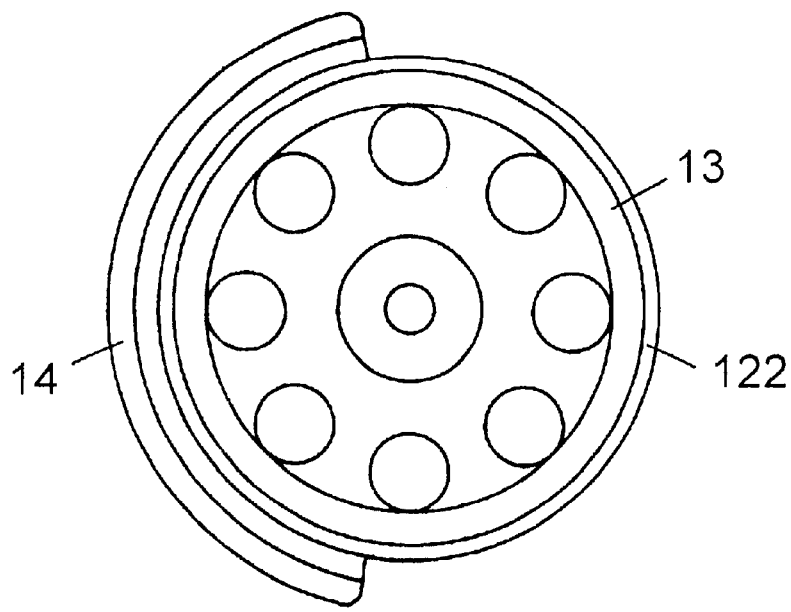
FIG. 2C is a bottom view of the rotor and the unbalancing weight.

FIG. 1 is a cross sectional view illustrating the construction of a motor in accordance with the first exemplary embodiment of the present invention. FIG. 2A is a plan view of a rotor and an unbalancing weight in accordance with the first exemplary embodiment, FIG. 2B is a side cross sectional view of the rotor and the unbalancing weight, and FIG. 2C is a bottom view thereof.

The motor illustrated in each drawing is a flat type motor whose axial height (thickness) is smaller than the width (outer diameter). The motor measures, e.g. 12.7 mm(($\psi$), 4 mm (t), and its mass is 1.7 g.

Stator 1 comprises stator core 6 shielded by an insulating film on its surface and wound by coils 7.

Printed circuit board 2 is a double-sided and through-holed board, and has a bottom face, a back face of the bottom face, and side ends. The stator is mounted to the back face. A plurality of lands 21, 25 exist on the bottom face. A plurality of lands 22 also exist on the back face where the stator is mounted. Bearing 3 is mounted on the back face. Stator 1 is co-axially mounted to bearing 3. The terminals of coils 7 wound on stator core 6 are soldered to lands 22 on the back face. Lands 22 are electrically coupled to lands 21 on the bottom face via through holes 24.

Bearing 3 comprises housing 8 with a bottom plate, thrust receptacle 10 disposed on the bottom plate, and oil-impregnated metal 9 fit into housing 8.

Rotor 4 comprises magnet 13 and yoke 12 fixed to the outer wall of magnet 13, and is shaped in a cup. In other words, yoke 12 surrounds the entire outer wall of magnet 13. This yoke is made from ferromagnetic material, and forms a magnetic path by facing the stator core via the magnet in between. A first end of shaft 11 is fixed to the center of rotor 4. Rotor 4 comprises flat section 121 and cylinder section 122, and surrounds stator 1.

Shaft 11 is fit into oil-impregnated metal 9, and a second end of shaft 11 is supported by thrust receptacle 10. Rotor 4 is thus journaled by bearing 3. Magnet 13 faces stator core 6 via an annular space.

The motor used in the first exemplary embodiment thus forms a flat brushless motor having the core. This motor is an outer rotor type and produces the radial air-gap magnetic field. Further, this motor includes unbalancing means. Various methods for producing unbalance are available, and in this embodiment, unbalance weight 14 is fixed to an outer wall of cylinder section 122 having a function of magnetic-path-yoke, thereby producing unbalance.

Cylinder section 122 and unbalancing weight 14 are welded to weld section 42 by irradiating with a laser beam. Flat section 121 and shaft 11 are also welded to weld section 41 by irradiating with a laser beam.

Cover 5 is a lightweight shell made from foil. Cover 5 shields rotor 4, and the edge of cover 5 contacts with the side ends of board 2, whereby the cover edge is fixed to the side ends by soldering.

In this motor, cover 5 thus largely forms an upper face and a side face of the motor, and board 2 forms a bottom face and parts of the side face of the motor.

The motor thus constructed is directly mounted to a board (reference number 2001 in FIG. 13) of a portable device. To be more specific, lands 21 and 25 of board 2 of the motor are soldered in a reflow bath with the lands of a substrate of the portable device. On the substrate of the portable device, a motor-driving-circuit (reference number 2002 in FIG. 13) is formed, and this board powers the motor through lands 21 and 25, thereby exciting stator 1. Attraction and repulsion between stator 1 and magnet 13 result in rotating rotor 4. Since unbalancing weight 14 is mounted to rotor 4, the vibration produced by rotating rotor 4 is imparted to the portable device, thereby a holder of this portable device can sense a call sign, an alarm sign or other information.

The motor used in this first exemplary embodiment employs the structure having a core and radial air-gap type magnetic field so that higher permeance than the coreless structure can be expected, i.e. a small size magnet can produce rather large magnetic flux. As a result, a small size and lightweight motor that can produce a large output per unit-weight of the motor is achievable. Yoke 12 is disposed over approximately the entire outer wall of magnet 13 whereby the magnetic circuit is not divided but rendered a closed circuit. This arrangement prevents magnet 13 from losing its capability. A small size and lightweight motor with lower power consumption free from lowering of a volumetric efficiency of the motor can be thus realized.

Since unbalancing weight 14 is disposed on the outer wall of yoke 12, the maximum eccentric gravity distance is obtainable so that vibrations per unit-weight of the unbalancing weight can be maximized. As a result, the maximum vibration by the same bearing load can be obtained and the ratios of vibration vs. power consumption, vibration vs. weight can be increased. A motor accommodating all the features discussed above is constructed in a flat structure thereby satisfying also all the requirements, i.e. a vertical shaft, a small size and lightweight, lower power consumption and greater vibration.

In rotor 4, unbalancing weight 14 is fixedly welded to the outer wall of yoke 12, i.e. cylinder section 122, by irradiating laser beam. This welding method effects a stronger coupling free from dispersion compared with a bonding method.

For instance, the following coupling-strength-comparison-test data is referenced. (A number of samples is 5 in each case, an average is expressed with "x", and a standard deviation is expressed with "s".)

The bonding method produces this data: 112, 80, 175, 175, and 88 x=126, s=41 (unit: kgf)

The welding method produces this data: 141, 125, 114, 129, and 157 x=133, s=15 (unit: kgf)

These data prove that the welding causes the better coupling than the bonding. The welding by irradiating with a laser beam allows the unbalancing weight to withstand a large load of drop shock whereby a reliable motor and a portable device using the motor are achievable.

Unbalancing weight 14 is made from at least one of tungsten or copper. The specific gravity of each metal is ca. 19 and 9 respectively, and they are heavier than that of iron, thereby obtaining a vibrating motor producing great vibration in a rather small volume.

Further, if the tungsten alloy of unbalancing weight 14 contains copper, the unbalancing weight approximates its melting temperature to that of iron. Therefore, better welding with the yoke made of iron can be expected, thereby increasing the coupling strength. For instance, tungsten is melted ca. at 3400° C., and iron is at 1500° C. Iron and tungsten thus cannot be welded because only the iron is melted. However, when the unbalancing weight made from an alloy comprising at least one of tungsten or copper is used, the melting temperature of the unbalancing weight lowers near to that of iron, and this allows the unbalancing weight to be welded with the yoke. The proper percentage of copper content is 5–10% weight ratio. When the unbalancing weight having the percentage of tungsten content being not less than 96% is used, it is hard to weld this unbalancing weight and the yoke, as discussed above.

As such, a proper alloy is welded by irradiating laser beam at an appropriate condition thereby increasing the coupling reliability of the unbalancing weight. As a result, the motor and the portable device using the motor can increase their reliabilities.

A method of assembling the motor in accordance with this first exemplary embodiment comprises the steps of:

(a) fixedly mounting the shaft at the center of the rotor;
(b) disposing the unbalancing weight on the outer wall of the rotor;
(c) fixedly welding the rotor and shaft by irradiating a laser beam; and
(d) fixedly welding the rotor and unbalancing weight by irradiating with a laser beam.

These four steps are carried out on the same work station.

The motor in accordance with the first embodiment is employed in a portable device, and rotor 4 sometimes encounters an extraordinary large shock. Shaft 11 and rotor 4 are welded by irradiating laser beam at flat section 121 of rotor 4 so that rotor 4 can bear the large shock. On the same work station, unbalancing weight 14 is also welded so that an assembly time and assembly equipment can be shared by these two steps, and this improves the manufacturing productivity of the rotor. As a result, the manufacturing productivity of the motor producing large vibrations with high reliability is improved.

Further in this embodiment, the laser beam for welding is irradiated axially and to a single surface. Therefore, a single laser head can be used for this welding, so that inexpensive manufacturing equipment can assemble the motor with a high productivity.

In the second through the seventh exemplary embodiments, a structure, where the unbalancing weight is engaged with a recess or a protrusion provided on the rotor, is demonstrated with reference to FIG. 3 through FIG. 8. Each embodiment proves that the unbalancing weight can be effectively mated with the rotor, and in this case the weight can be secured more efficiently by using one of welding or bonding.

(Exemplary Embodiment 2)

Figure 3A:
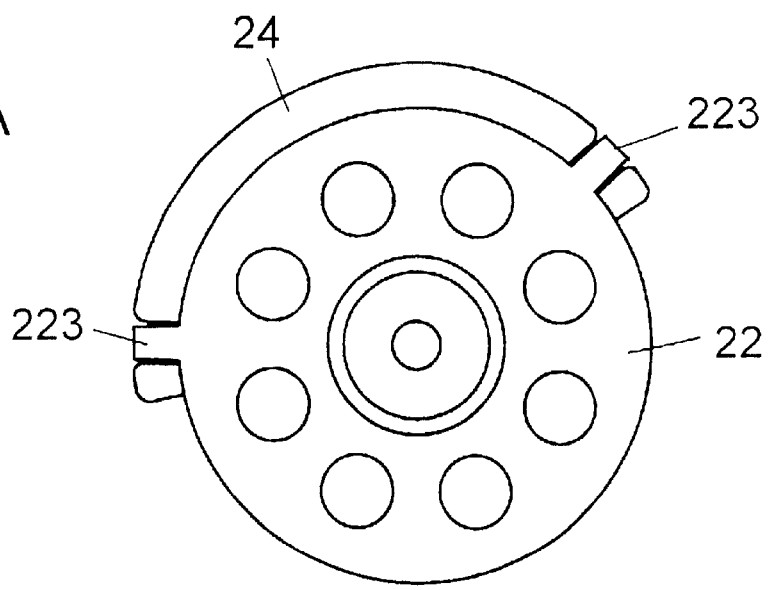
FIG. 3A is a plan view of a rotor and an unbalancing weight in accordance with a second exemplary embodiment of the present invention.
Figure 3B:
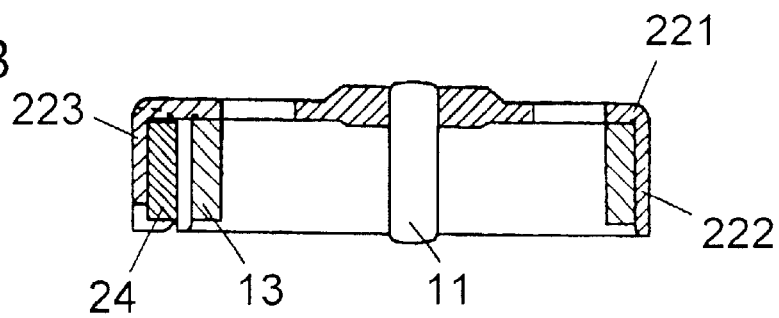
FIG. 3B is a side cross sectional view of the rotor and the unbalancing weight.
Figure 3C:
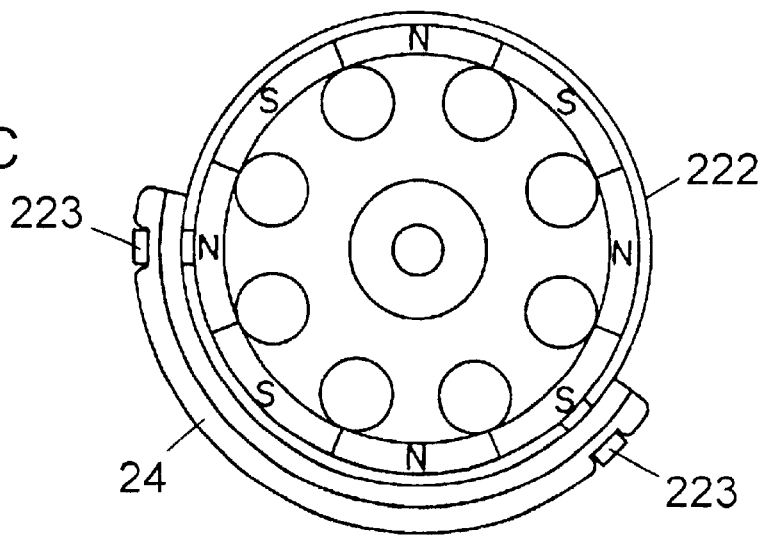
FIG. 3C is a bottom view of the rotor and the unbalancing weight.

FIG. 3A is a plan view of a rotor and an unbalancing weight in accordance with the second exemplary embodiment of the present invention, FIG. 3B is a side cross sectional view of the rotor and the unbalancing weight and FIG. 3C is a bottom view of the rotor and the unbalancing weight. In this second embodiment, protrusions are formed on a flat section of a cup-shaped rotor outwardly from a cylinder section of the rotor, and the unbalancing weight is held between the protrusions and the cylinder section.

In FIG. 3A through FIG. 3C, cup-shaped rotor 22 forms protrusion 223 on flat section 221 outwardly extending from the rotor rim in a radial direction, and the unbalancing weight 24 is held between protrusions 223 and cylinder section 222. Parts of cylinder section 222 are cut away thereby forming protrusions 223. Unbalancing weight 24 is inserted from the opening end between protrusions 223 and cylinder section 222, and tip sections of protrusions 223 are bent so that the unbalancing weight is secured with ease. However, parts of cylinder section 222 are cut away thereby dividing a magnetic path in a circumference direction. The center of magnetic pole of the magnet is placed at the cut-away section in order to reduce the influence of dividing the magnetic-path. The magnetic flux produced by the magnetic pole of the magnet travels toward the adjacent magnetic pole. Cutting away a part of cylinder section 222 where the center of the magnetic pole is situated thus does not divide the magnetic flux. As a result, the negative affect by cutting away is minimized.

The construction discussed above allows the rotor to secure the unbalancing weight with high reliability.

(Exemplary Embodiment 3)

Figure 4A:
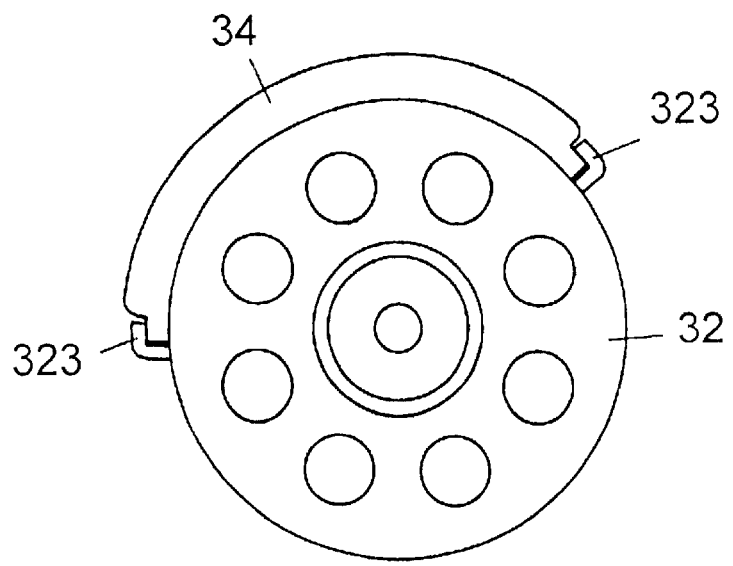
FIG. 4A is a plan view of a rotor and an unbalancing weight in accordance with a third exemplary embodiment of the present invention.
Figure 4B:
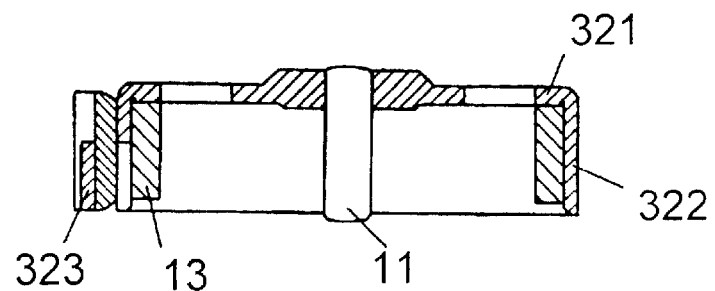
FIG. 4B is a side cross sectional view of the rotor and the unbalancing weight.
Figure 4C:
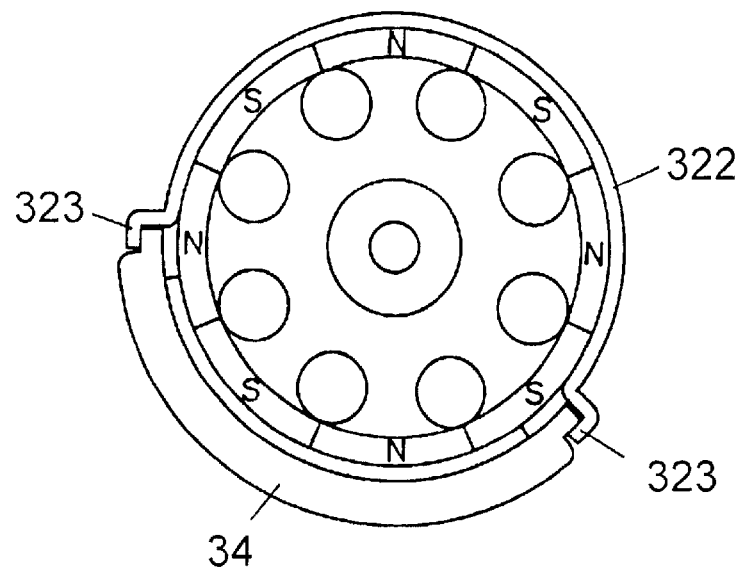
FIG. 4C is a bottom view of the rotor and the unbalancing weight.

FIG. 4A is a plan view of a rotor and an unbalancing weight in accordance with the third exemplary embodiment of the present invention, FIG. 4B is a side cross sectional view of the rotor and the unbalancing weight and FIG. 4C is a bottom view of the rotor and the unbalancing weight. In this third embodiment, protrusions are formed on the cylinder section of the cup-shaped rotor outwardly from the cylinder section, and the unbalancing weight is held between the protrusions and the cylinder section.

In FIG. 4A through FIG. 4C, cup-shaped rotor 32 has flat section 321 and cylinder section 322. Protrusions 323 are extended in a radial direction outwardly and tips of protrusions are bent so that unbalancing weight 34 can be secured by the tips and the outer wall of cylinder section 322. Protrusions 323 are formed by cut-away parts of cylinder section 322. The depth of cut-away part is no deeper than approximately a half of the thickness of cylinder section 322, and this structure allows the yoke to minimize the lowering of its function.

The cut-away part of cylinder section 322 is placed at the center of magnetic pole of the magnet 13 so that negative affect due to the cut-away to the magnetic path in the circumference direction can be reduced. This is the same arrangement as in the second embodiment.

The construction discussed above allows the rotor to secure the unbalancing weight with high reliability.

(Exemplary Embodiment 4)

Figure 5A:
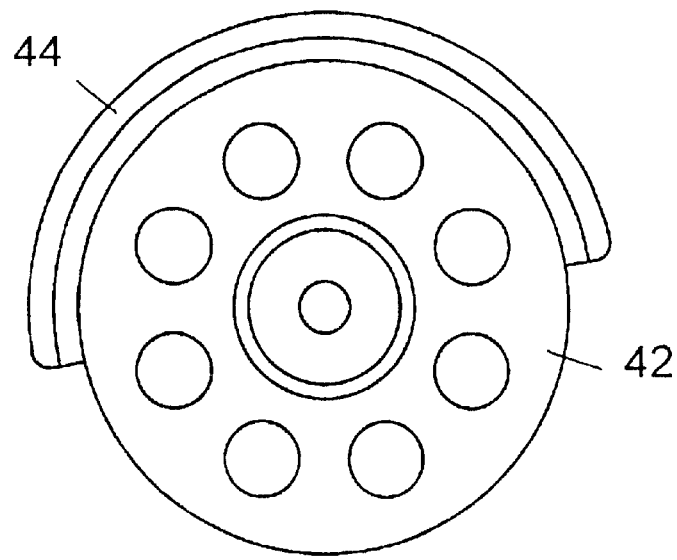
FIG. 5A is a plan view of a rotor and an unbalancing weight in accordance with a fourth exemplary embodiment of the present invention.
Figure 5B:
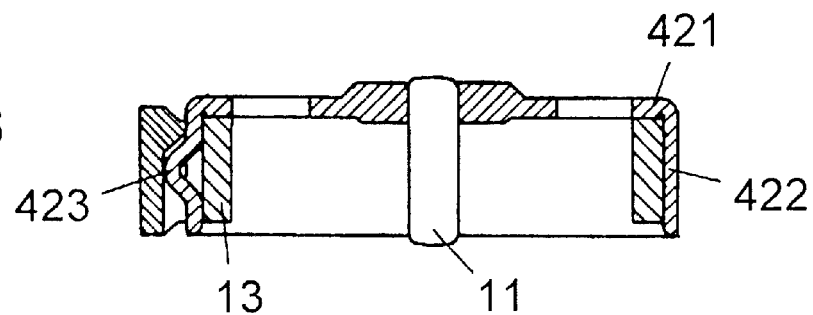
FIG. 5B is a side cross sectional view of the rotor and the unbalancing weight.
Figure 5C:
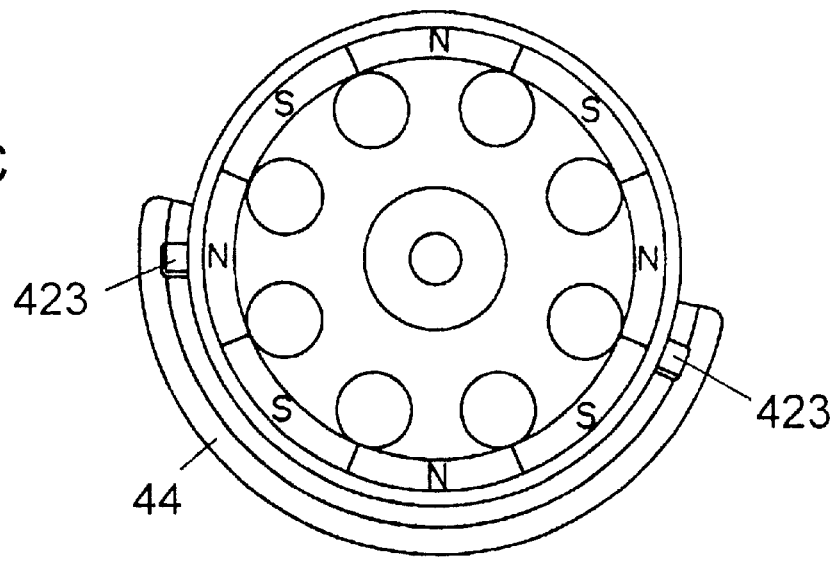
FIG. 5C is a bottom view of the rotor and the unbalancing weight.

FIG. 5A is a plan view of a rotor and an unbalancing weight in accordance with the fourth exemplary embodiment of the present invention, FIG. 5B is a side cross sectional view of the rotor and the unbalancing weight and FIG. 5C is a bottom view of the rotor and the unbalancing weight. In this fourth embodiment, protrusions are formed on a cylinder section of a cup-shaped rotor outwardly, and an unbalancing weight has recesses corresponding to the protrusions so that they mate with each other.

In FIG. 5A through FIG. 5C, cup-shaped rotor 42 has flat section 421 and cylinder section 422. Two small protrusions 423 are formed on cylinder section 422 outwardly. Unbalancing weight 44 has recesses corresponding to protrusions 423, and they are mated with each other. Protrusions 423 can be rather small in size and thus affect the yoke function negatively only a little. In this fourth embodiment, therefore, it is not necessary to place the magnet pole of magnet 13 at protrusion 423, and this improves the assembly efficiency. As shown in FIG. 5C, first protrusion 423 is placed at the center of magnetic pole of the magnet and second protrusion 423 is placed near the border of magnetic pole, thereby narrowing the dispersion of motor characteristics.

The construction discussed above allows the rotor to secure the unbalancing weight with high reliability.

(Exemplary Embodiment 5)

Figure 6A:
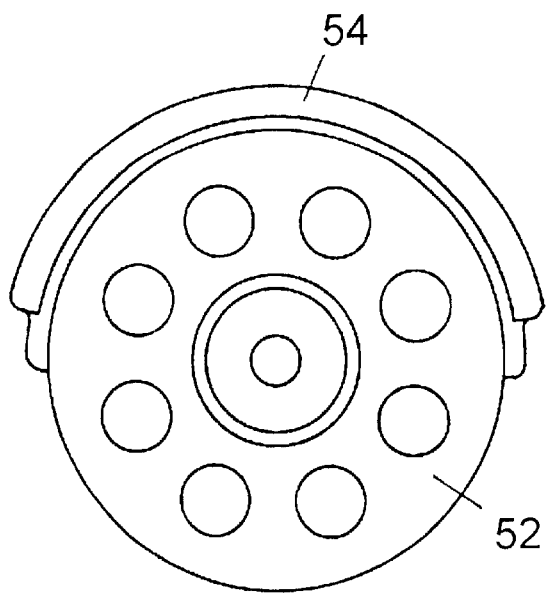
FIG. 6A is a plan view of a rotor and an unbalancing weight in accordance with a fifth exemplary embodiment of the present invention.
Figure 6B:
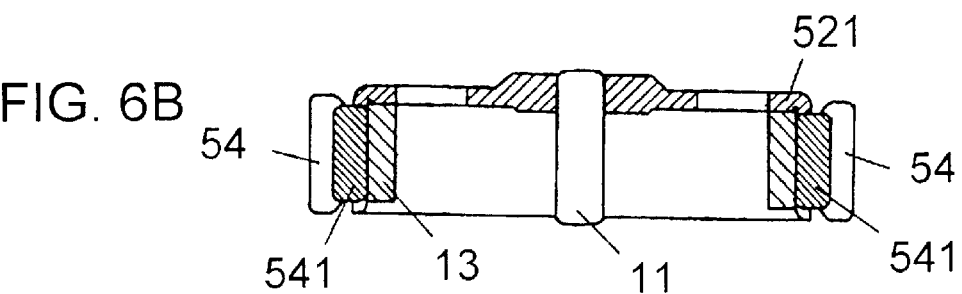
FIG. 6B is a side cross sectional view of the rotor and the unbalancing weight.
Figure 6C:
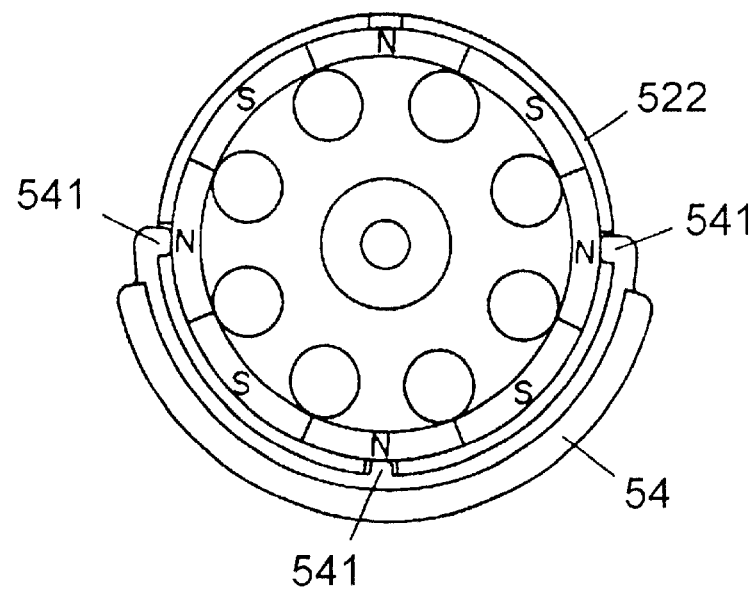
FIG. 6C is a bottom view of the rotor and the unbalancing weight.

FIG. 6A is a plan view of a rotor and an unbalancing weight in accordance with the fifth exemplary embodiment of the present invention, FIG. 6B is a side cross sectional view of the rotor and the unbalancing weight and FIG. 6C is a bottom view of the rotor and the unbalancing weight. In this fifth embodiment, recesses are formed on a cylinder section of a cup-shaped rotor, and an unbalancing weight has protrusions corresponding to the recesses, so that they mate with each other.

In FIG. 6A through FIG. 6C, cup-shaped rotor 52 has flat section 521 and cylinder section 522. Recesses are formed on cylinder section 522, and three protrusions 541 corresponding the recesses are formed on the unbalancing weight, so that the recesses and protrusions 541 mate with each other. The recesses can be formed with ease, e.g. by boring cylinder section 522 to form through holes.

The respective positions of recesses can be placed at the center of magnetic pole of the magnet 13, and this arrangement reduces negative affect to the motor due to the dividing of the magnetic path in a rim direction. This is the same arrangement as the second embodiment.

As such, the unbalancing weight is secured in a stable manner to the rotor with three mating points.

The structures disclosed in embodiments 2 through 5 prepare mating sections near the cylinder section of the rotor to mate the unbalancing weight. This structure secures the unbalancing weight in a stable manner by supporting the center of its gravity. In addition to the fixing strength by welding or bonding, this mating structure increases the fixing strength thereby enhancing the coupling reliability between the weight and rotor. As a result a reliable motor producing greater vibration is achievable. The recesses or protrusions provided to the weight are placed at the center of the magnet pole and mated with the rotor, thereby minimizing the negative affect to the magnetic flux. The higher reliability in the coupling of the weight and rotor is thus compatible with the higher efficiency of the motor.

(Exemplary Embodiment 6)

Figure 7A:
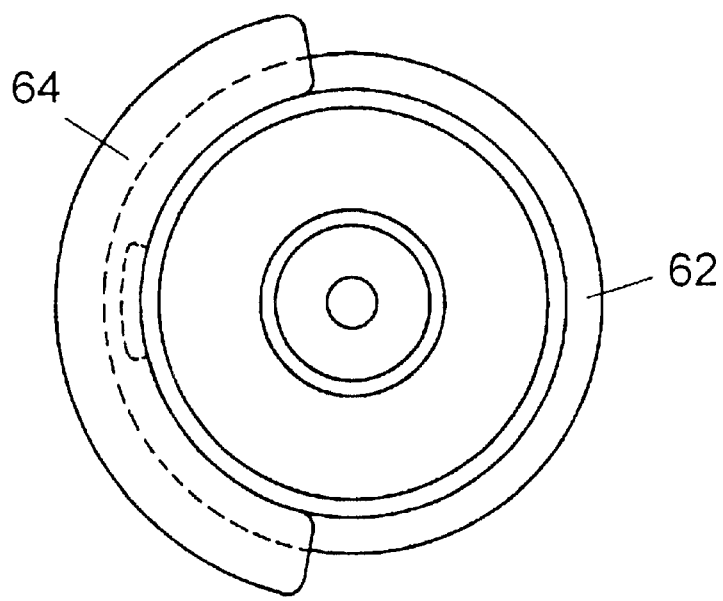
FIG. 7A is a plan view of a rotor and an unbalancing weight in accordance with a sixth exemplary embodiment of the present invention.
Figure 7B:
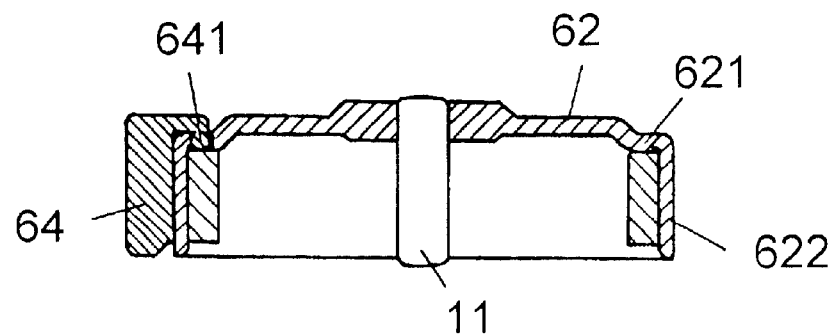
FIG. 7B is a side cross sectional view of the rotor and the unbalancing weight.
Figure 7C:
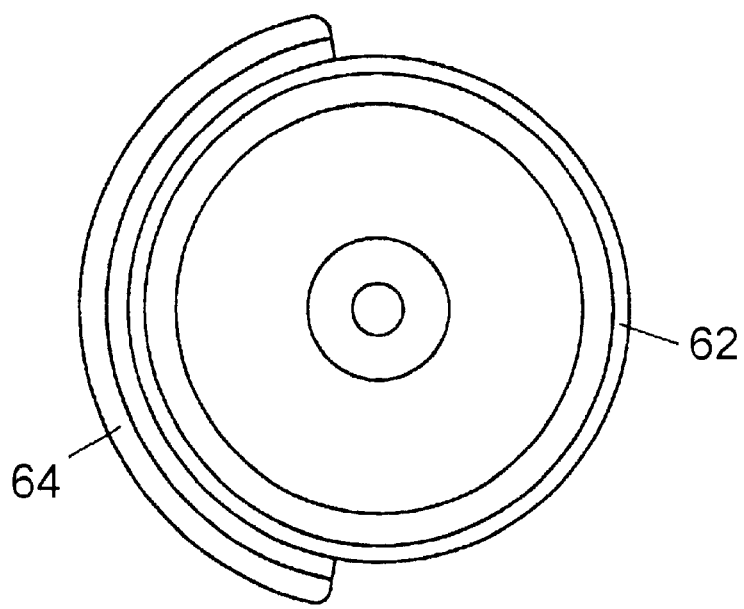
FIG. 7C is a bottom view of the rotor and the unbalancing weight.

FIG. 7A is a plan view of a rotor and an unbalancing weight in accordance with the sixth exemplary embodiment of the present invention, FIG. 7B is a side cross sectional view of the rotor and the unbalancing weight and FIG. 7C is a bottom view of the rotor and the unbalancing weight. In this sixth embodiment, a recess or a protrusion is formed on a flat section of a cup-shaped rotor, and an unbalancing weight has a protrusion or a recess corresponding to the recess or protrusion formed on the rotor so that they mate with each other.

In FIG. 7A through FIG. 7C, cup-shaped rotor 62 has flat section 621 and cylinder section 622. A recess or a protrusion is formed on flat section 621, and protrusion 641 or recess corresponding to the recess or protrusion formed on flat section 621 is formed on unbalancing weight 64. The protrusion and recess mate with each other so that unbalancing weight 64 can be engaged with rotor 62. The recess or protrusion can be formed with ease and accuracy. In this embodiment, cylinder section 621 does not undergo any process, the yoke thus has a continuous magnetic path in a rim direction. As a result, a dispersion of the motor characteristics can be reduced.

(Exemplary Embodiment 7)

Figure 8A:
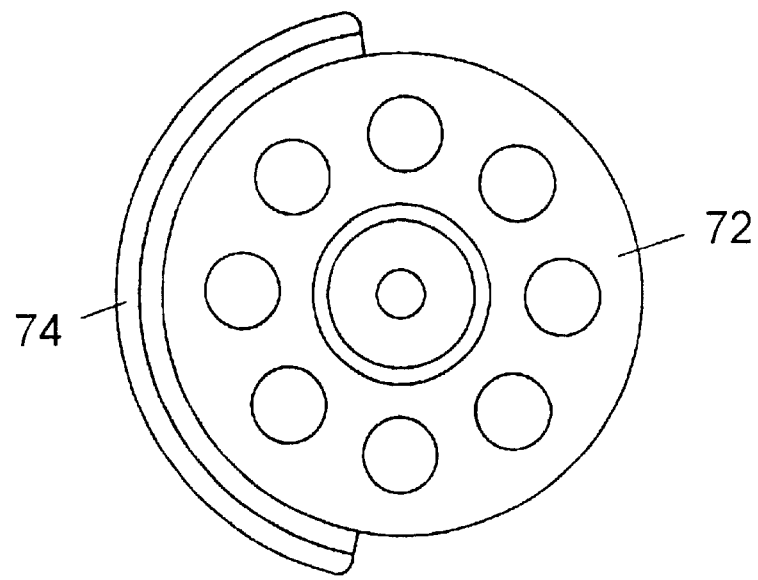
FIG. 8A is a plan view of a rotor and an unbalancing weight in accordance with a seventh exemplary embodiment of the present invention.
Figure 8B:
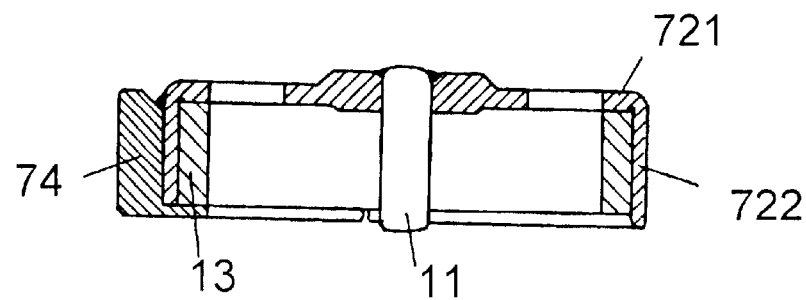
FIG. 8B is a side cross sectional view of the rotor and the unbalancing weight.
Figure 8C:
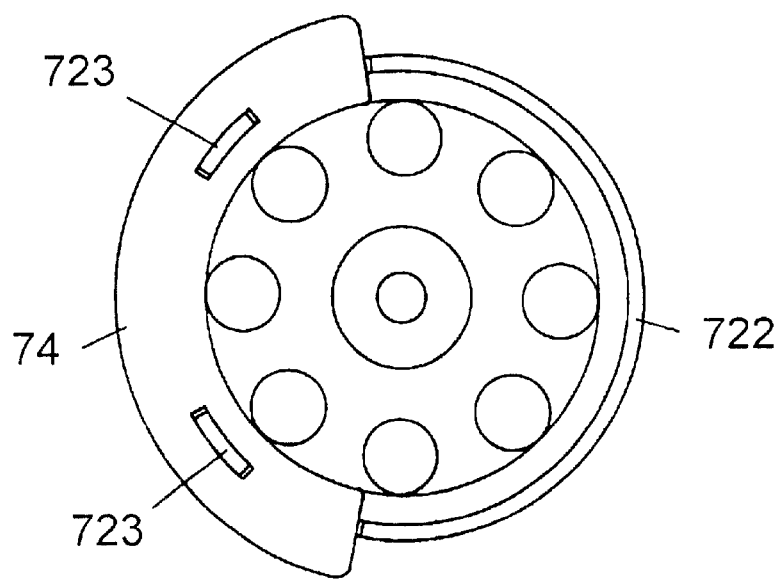
FIG. 8C is a bottom view of the rotor and the unbalancing weight.

FIG. 8A is a plan view of a rotor and an unbalancing weight in accordance with the seventh exemplary embodiment of the present invention, FIG. 8B is a side cross sectional view of the rotor and the unbalancing weight and FIG. 8C is a bottom view of the rotor and the unbalancing weight.

In this seventh embodiment, recesses or protrusions are formed on an end face of an opening of a cup-shaped rotor, and an unbalancing weight has protrusions or recesses corresponding to the recesses or protrusions formed on the rotor, so that they mate with each other.

In FIG. 8A through FIG. 8C, cup-shaped rotor 72 has flat section 721 and cylinder section 722. Protrusions 723 are formed on the end face of the opening of rotor 72, and recesses corresponding to protrusions 723 are formed on unbalancing weight 74 so that the protrusions and recesses mate with each other. Therefore, a continuous magnetic path is formed on the yoke in a rim direction, so that a dispersion of motor characteristics can be reduced. This is the same phenomenon as the sixth embodiment discussed before. The structure of this embodiment is suitable for a case when an open space is available beneath the rotor.

The sixth and seventh embodiments discussed above disclose a structure where sections to be engaged with the unbalancing weight are formed on or beneath the cylinder section of the rotor. The unbalancing weight is formed in a complicated shape because it should mate with the cylinder section or the flat section of the rotor; however, this complicated shape increases its weight thereby producing the greater vibration. Since this structure allows the yoke not to be divided, and this forms the continuous magnetic path free from losing magnetic flux.

(Exemplary Embodiment 8)

Figure 9:
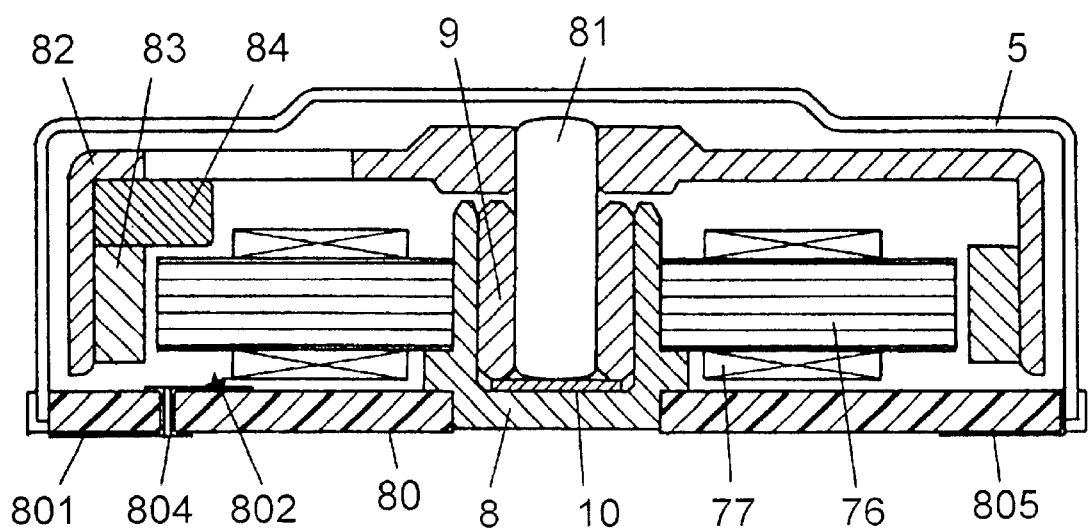
FIG. 9 is a cross sectional view illustrating a motor in accordance with an eighth exemplary embodiment of the present invention.
Figure 10A:
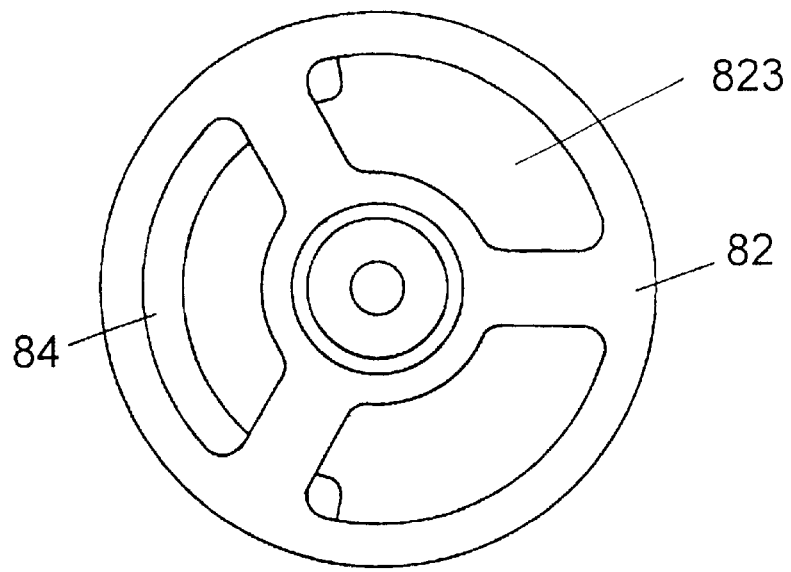
FIG. 10A is a plan view of a rotor and an unbalancing weight in accordance with the eighth exemplary embodiment of the present invention.
Figure 10B:
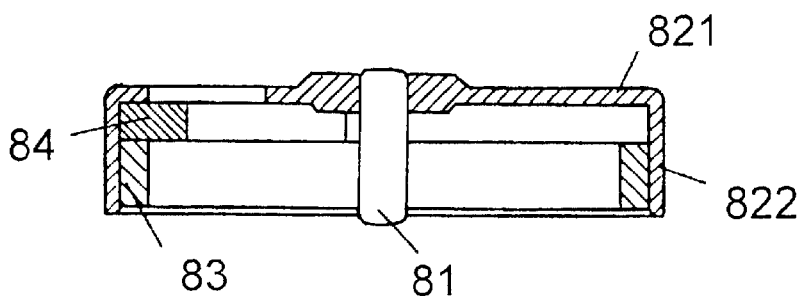
FIG. 10B is a side cross sectional view of the rotor and the unbalancing weight.
Figure 10C:
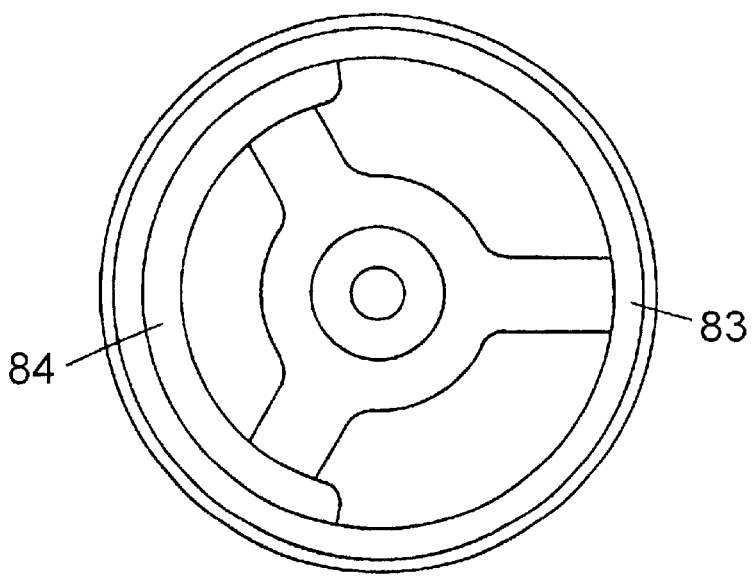
FIG. 10C is a bottom view of the rotor and the unbalancing weight.

FIG. 9 is a cross sectional view illustrating a motor in accordance with the eighth exemplary embodiment of the present invention. FIG. 10A is a plan view of a rotor and an unbalancing weight in accordance with the eighth exemplary embodiment, FIG. 10B is a side cross sectional view of the rotor and the unbalancing weight and FIG. 10C is a bottom view of the rotor and the unbalancing weight.

A construction of the motor in accordance with the eighth embodiment is shown in FIG. 9, FIGS. 10A, 10B and 10C. This construction is similar to the construction of the motor used in the first embodiment shown in FIG. 1, FIGS. 2A, 2B and 2C except a structure of the rotor. The difference of the rotor structure naturally entails a different shape of a stator. Other sections have little differences and the descriptions thereof are thus omitted here.

The stator is formed by winding coil 77 on stator core 76. The outer diameter of stator core 76 is greater than that of the stator core used in the first exemplary embodiment.

Printed circuit board 80 has the same dimensions as that used in the first embodiment; however, the locations of land 802 and the like are moved due to a dimensional change of stator core 76. On the back face of board 80, lands 801, 805 and the like are formed, thus board 80 can be mounted to a printed circuit board of the portable device to which the motor is mounted by soldering in a reflow bath. Lands 801 and 802 are electrically coupled via through hole 804.

Cup-shaped rotor 82 comprises magnet 83 and a yoke fixedly mounted to the outer wall of the magnet. Rotor 82 has flat section 821 and cylinder section 822, and cut-away holes 823 are formed on flat section 821. This cylinder section functions as the yoke. Magnet 83 faces stator core 76 via an annular space.

Shaft 81 is fixedly mounted at the center of rotor 82. Shaft 81 is journaled by a bearing formed by oil-impregnated metal 9 fit into the inner wall of housing 8 and thrust receptacle 10 disposed on a bottom plate of housing 8.

Unbalancing weight 84 is fixedly mounted on magnet 83 fixed on the inner wall of cylinder section 822. In the first embodiment shown in FIG. 1, the unbalancing weight is disposed on the outer circumference of the rotor (on the outer wall of the yoke), however, in this eighth embodiment the weight is positioned inside of the rotor (inner wall of the yoke, i.e. cylinder section 822.) The greater diameter of stator core 76 increases the diameter of magnet 83.

Cover 5 has the same dimensions as the one used in the first embodiment, and an outlook of the motor used in the eighth embodiment thus looks to be the same as that used in the first embodiment.

As discussed above, in the motor used in the eighth embodiment, the rotor has the magnet and yoke, and the unbalancing weight is disposed in the yoke. The magnet faces the stator core via the annular space. The yoke surrounds almost entire circumference of the magnet. The unbalancing weight is disposed axially on the magnet. This structure allows the unbalancing weight to be accommodated in an open space of the motor having radial air-gap type magnetic field, thereby reducing the entire volume of the motor. A small size and lightweight motor is thus achievable. Further, the rotor accommodates the unbalancing weight therein, therefore, the motor free from the fear of the weight being dropped off the rotor is realized. The magnet and stator core can increase their diameters so that a greater output per unit-weight can be expected. In other words, the motor with less weight can produce the same output as a conventional motor.

(Exemplary Embodiment 9)

Figure 11A:
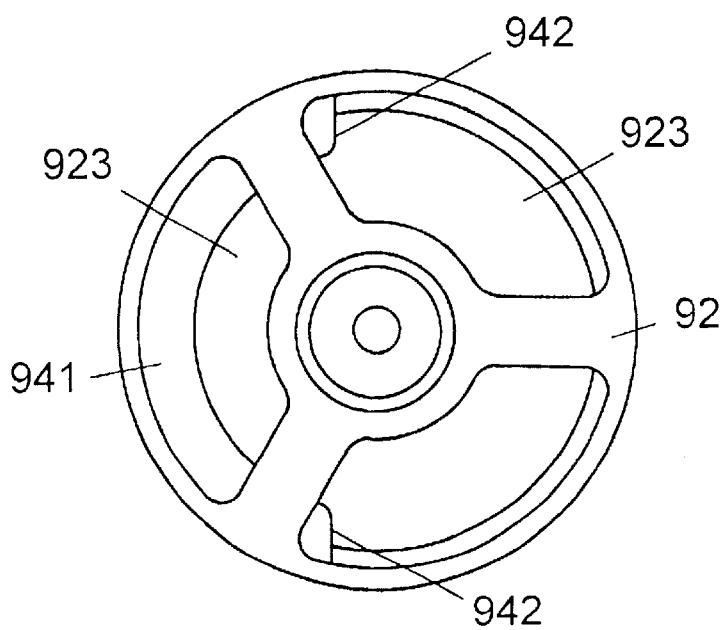
FIG. 11A is a plan view of a rotor and an unbalancing weight in accordance with a ninth exemplary embodiment of the present invention.
Figure 11B:
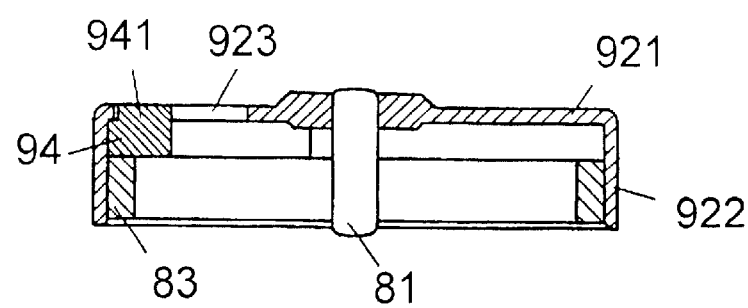
FIG. 11B is a side cross sectional view of the rotor and the unbalancing weight.
Figure 11C:
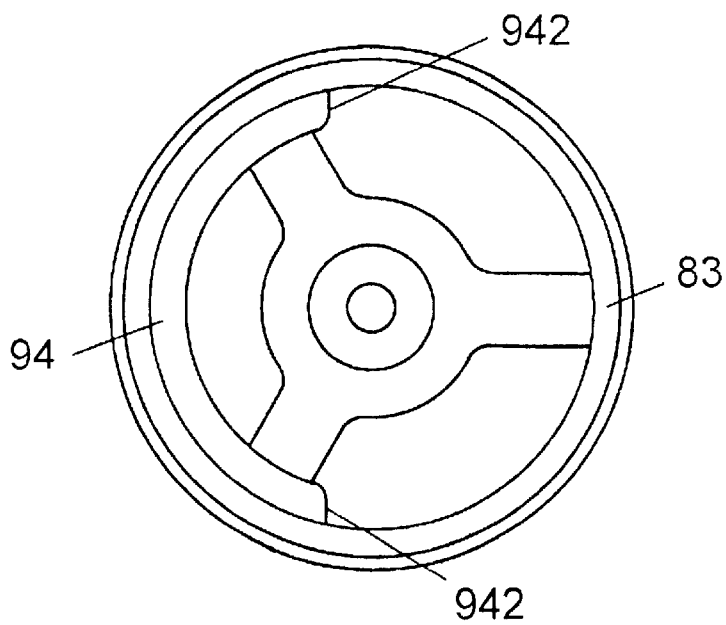
FIG. 11C is a bottom view of the rotor and the unbalancing weight.

FIG. 11A is a plan view of a rotor and an unbalancing weight in accordance with the ninth exemplary embodiment of the present invention, FIG. 11B is a side cross sectional view of the rotor and the unbalancing weight and FIG. 11C is a bottom view of the rotor and the unbalancing weight. In this embodiment, cutaway holes are formed on a flat section of a cup-shaped rotor, and an unbalancing weight is disposed in the holes. This ninth embodiment is a modification of the eighth embodiment.

In FIG. 11A through FIG. 11C, cup-shaped rotor 92 has flat section 921 and cylinder section 922. In the same manner as the eighth embodiment, cut-way holes 923 are formed on flat section 921.

Protrusion 941 is formed on a part of unbalancing weight 94, and protrusion 941 is placed at cut-away holes 923.

In this ninth embodiment, when the rotor is assembled, unbalancing weight 94 is desirably positioned with regard to rotor 92; however, unbalancing weight 94 is just axially inserted into hole 923, and this completes the assembling. This additional step requires only a little labor and time.

The ninth embodiment can produce the same effect as the eighth one.

(Exemplary Embodiment 10)

Figure 12A:
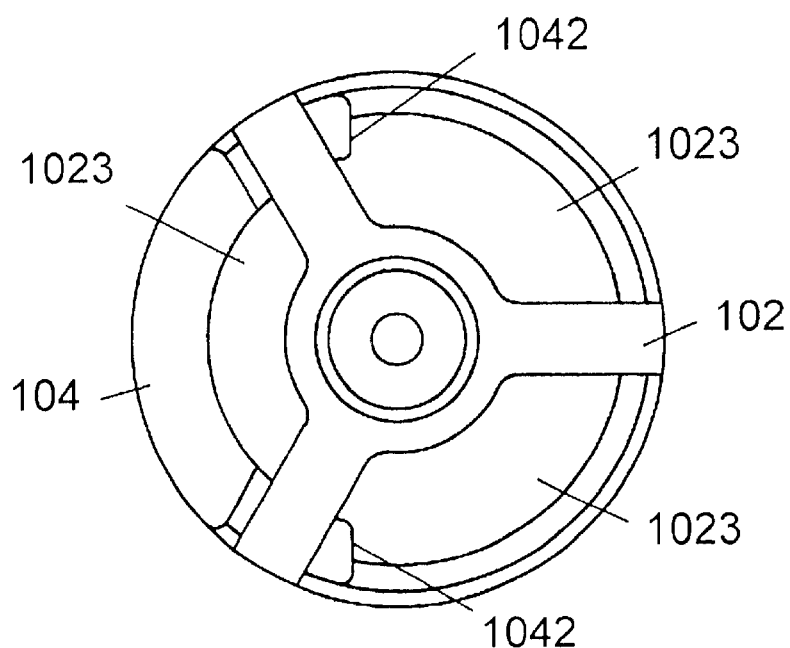
FIG. 12A is a plan view of a rotor and an unbalancing weight in accordance with a tenth exemplary embodiment of the present invention.
Figure 12B:
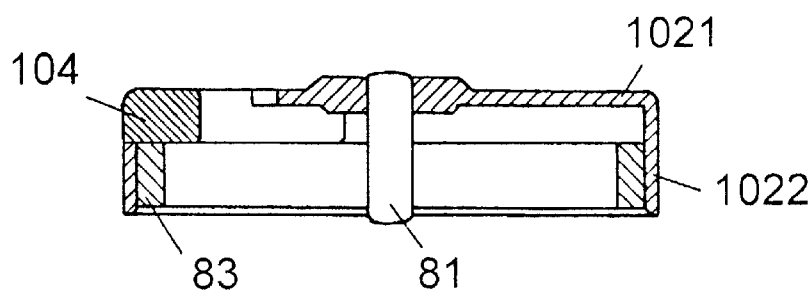
FIG. 12B is a side cross sectional view of the rotor and the unbalancing weight.
Figure 12C:
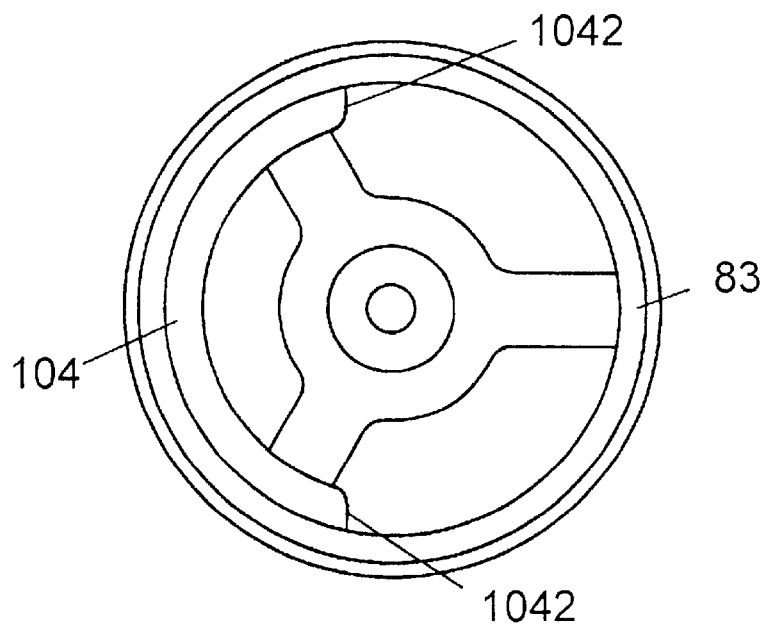
FIG. 12C is a bottom view of the rotor and the unbalancing weight.

FIG. 12A is a plan view of a rotor and an unbalancing weight in accordance with the tenth exemplary embodiment of the present invention, FIG. 12B is a side cross sectional view of the rotor and the unbalancing weight and FIG. 12C is a bottom view of the rotor and the unbalancing weight. In this embodiment, cut-away holes are formed on a flat section and a cylinder section of a cup-shaped rotor, and an unbalancing weight is disposed in those holes.

This tenth embodiment is also a modification of the eighth embodiment.

In FIG. 12A through FIG. 12C, cup-shaped rotor 102 has flat section 1021 and cylinder section 1022. Cut-away holes 1023 formed on flat section 1021 and cylinder section 1022. Unbalancing weight 104 is disposed in cut-away hole 1023. When this rotor is assembled, unbalancing weight is required to move in a radial direction with regard to rotor 102 to be disposed in the holes. Although this assembly requires additional labor and time; however, this structure produces greater vibration within a limited volume.

As such, in the ninth and tenth embodiments, parts of the cup-shaped rotor are cut away, and at least parts of the unbalancing weight is disposed in the holes. In this arrangement, a specific gravity of a part of the cup-shaped rotor is to be replaced with the specific gravity of the unbalancing weight, thereby producing the greater vibration within a limited volume. As a result, a small size and lightweight motor producing large vibration is achievable.

In the ninth and tenth embodiments, remaining portions after the holes are cut away from a weight material (forming a hollow cylinder) form unbalancing weights 94 and 104, i.e. remained wall thickness in the hollow cylinder forms respective weights 94 and 104. End faces 942 and 1042 on both ends of unbalancing weights 94 and 104 are arranged to be approximately vertical with regard to the deviated gravity of the rotor. When both ends of the unbalancing weight form the shape as discussed above, a distance from the shaft center to the gravity center can be maximized at the same volume of any unbalancing weights. In other words, a lightweight motor producing large vibration and maximizing the ratio of weight vs. vibration is achievable.

(Exemplary Embodiment 11)

Figure 13:
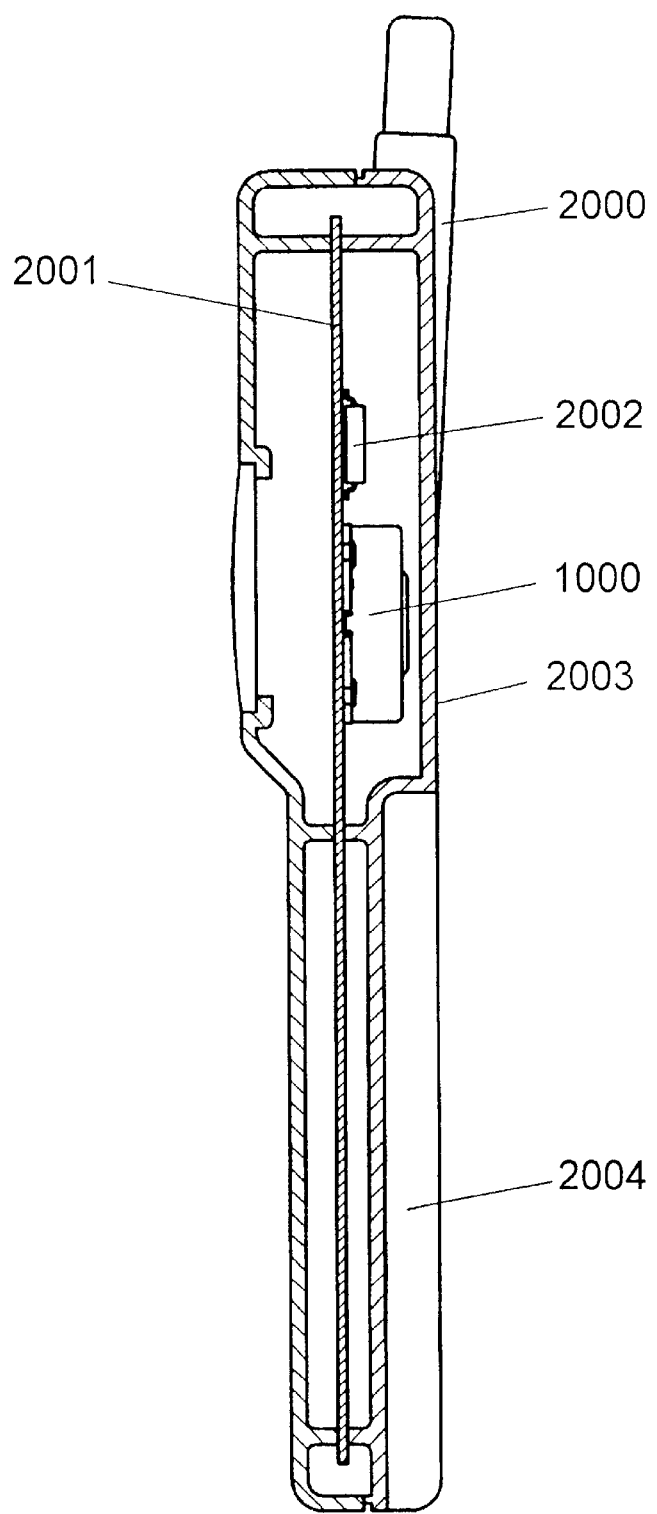
FIG. 13 is a side cross sectional view of a portable device in accordance with an eleventh embodiment of the present invention.

The motor discussed previously can be directly mounted on substrate 2001 of portable device 2000 as shown in FIG. 13. More specifically, motor 1000 is mounted to the substrate of the device by soldering a land provided on a motor's board with a land provided on the device's substrate 2001 in a reflow bath. Motor-driving-circuit 2002 is formed on substrate 2001 powering the motor via lands 21 and 25 formed on motor's board. The stator is thus excited. Repulsion and attraction between the stator and magnet rotates the rotor. Since the rotor has the unbalancing weight, rotating of the rotor imparts the vibration to portable device 2000, thereby transmitting a call, alarm or other information as a sensible message to a holder of the device. The device's substrate is disposed in parallel with a bottom plate 2003 of the device, and the rotary shaft of the motor is placed vertically with regard to device's substrate 2001. Therefore, the vibration is produced in a parallel direction with the bottom plate of the device. The device is driven by battery 2004.

The portable device in accordance with this eleventh embodiment thus disposes an ultra-thin vibrating motor in parallel with the bottom plate so that the device can have an extraordinarily as well as a highly value added body. Further, since the rotary shaft of this vibrating motor is disposed vertically with regard to the bottom plate of the device, the vibrating direction is approximately parallel with the bottom plate, thereby reducing a force lifting the device off a desk. As a result, the device is prevented from falling off the desk.

The present invention, as discussed previously, can provide a small size and lightweight motor producing the maximum vibration at low power consumption. This motor is available in a thin and flat construction with high reliability. As a result, a thin and lightweight portable device operable for long hours can be realized.

The flat vibrating motor of the present invention can be assembled into the portable device so that the motor shaft can be substantially vertical with regard to the bottom face of the portable device. This structure allows the portable device to be thinner and decrease its movement on a desk due to the vibration.

The yoke, making up the cup-shaped rotor, does not necessarily form a shape having a flat section and a cylinder section. For instance, the rotor can comprise a cylindrical yoke forming a magnetic path and another member forming a flat section. The rotor does not necessarily form a cup-shape.

What is claimed is:

1. A vibrator motor comprising:

a stator including a stator core wound by a coil;

a rotor including a magnet separated from the stator core by a space and a yoke disposed on an outer wall of the magnet, and an unbalancing weight disposed on a wall of the yoke to cause said yoke to be unbalanced.

2. The motor as defined in claim 1 wherein said rotor forms a cup shape.

3. The motor as defined in claim 1 wherein said unbalancing weight is fixedly welded on the outer wall of the yoke.

4. The motor as defined in claim 1 wherein said unbalancing weight comprises at least one of tungsten and copper.

5. The motor as defined in claim 1 wherein said unbalancing weight is engaged and secured with one of a recess and a protrusion formed on said rotor.

6. The motor as defined in claim 5 wherein one of the recess and the protrusion formed on said rotor is provided near to a center of a magnetic pole of the magnet with regard to a rotating direction of the motor.

7. The motor as defined in claim 1 wherein said unbalancing weight is disposed axially one of on the magnet and beneath the magnet.

8. The motor as defined in claim 1 wherein at least a part of said unbalancing weight is disposed at a cut-away section formed on said rotor.

9. A vibrator motor comprising:

a stator including a stator core wound by a coil;

a rotor including a magnet separated from the stator core by a space and a yoke disposed on an outer wall of the magnet; and an unbalancing weight disposed on a wall of the yoke and outside a circumference defined by said yoke, said weight causing said yoke to be unbalanced.

* * * * *